United States Patent [19]

Bereskin

[11] 4,159,499
[45] Jun. 26, 1979

[54] GROUND FAULT DETECTION AND PROTECTION CIRCUIT

[76] Inventor: Alexander B. Bereskin, 452 Riddle Rd., Cincinnati, Ohio 45220

[21] Appl. No.: 807,962

[22] Filed: Jun. 20, 1977

[51] Int. Cl.² ............................................. H02H 3/16
[52] U.S. Cl. ........................................ 361/42; 361/44; 361/45; 361/46
[58] Field of Search ...................... 361/42, 44, 45, 46, 361/50; 340/253 H, 255; 324/51

[56] References Cited

U.S. PATENT DOCUMENTS

| | | | |
|---|---|---|---|
| 3,614,533 | 10/1971 | Douglas et al. | 361/44 |
| 4,021,729 | 5/1977 | Hudson, Jr. | 361/45 X |

Primary Examiner—Harry E. Moose, Jr.
Attorney, Agent, or Firm—Wood, Herron & Evans

[57] ABSTRACT

A circuit for detecting line-to-ground and neutral-to-ground faults and in response thereto interrupting the line conductor. Included in the circuit is a magnetic core about which the neutral conductor and line conductor are wound to produce a zero net magnetomotive force in the core in the absence of a line fault and a non-zero net magnetomotive force in the presence of a line fault. A secondary winding wound on the core has at least one diode or thermistor connected thereacross. The diode or thermistor has a dynamic impedance, which is reflected back to the neutral winding, which decreases when current flows through the diode or temperature rises in the thermistor in response to an induced voltage in the secondary winding caused by non-zero net magnetomotive force in the core produced by a current imbalance in the line and neutral conductors due to a line fault. Also included is a constant current high frequency oscillator and a voltage sensor connected across the neutral winding to detect decreases in neutral winding resistance due to a line fault and/or decreases in high frequency current through the neutral winding due to neutral fault. An electromechanical actuator responsive to the voltage monitor trips a circuit breaker to interrupt the line conductor when a neutral or line fault is detected by the voltage monitor. Alternatively, the constant current oscillator and voltage sensor could be replaced by a constant voltage oscillator connected between the load side of the neutral winding and ground and a current sensor in series with the oscillator for detecting line and neutral faults.

30 Claims, 5 Drawing Figures

GROUND FAULT DETECTION AND PROTECTION CIRCUIT

This invention relates to electrical protective circuits, and more particularly to ground fault detection and protection circuits for interrupting the supply of power to a load in response to a line-to-ground fault and/or a neutral-to-ground fault.

By way of background, a power distribution system for supplying electrical power to a load, such as an appliance, machine tool, or the like, typically includes at least one, and sometimes two or more, "hot" or line busses and a neutral bus which is connected to ground. The line and neutral busses are connected via line and neutral conductors to the load which is to be energized. A personnel safety hazard exists if either the line conductor or the neutral conductor become grounded at the load. Underwriters' Laboratory has determined that an unacceptable hazard to personnel safety is present when a line fault produces a line-to-ground current in excess of 5 milliamperes and/or when a neutral fault produces a neutral-to-ground resistance below 4 ohms.

Typically, past efforts to detect both netural and line faults have required that a separate circuit be provided for detecting each kind of fault. This has added to the complexity, cost and size of the protection circuitry, as well as reduced its reliability. It has been an objective of this invention, therefore, to provide a single circuit capable of reliably detecting both line and neutral faults and one which does so with a minimum number of electrical components.

The foregoing objective has been accomplished in accordance with the principles of this invention by providing a magnetic core inductively coupled to the line and neutral conductors in a manner such that in the absence of a line or neutral fault the net magnetomotive force in the core is zero, but in the presence of a line-to-ground fault, the net magnetomotive force becomes non-zero due to the resulting current imbalance in the line and neutral conductors. Also wound on the core is a secondary winding in which a voltage is induced in response to a net non-zero magnetomotive force caused by a current imbalance in the neutral and ground conductors occasioned by a line-to-ground fault. Connected across the secondary winding is a load which exhibits a decreasing dynamic impedance, which is reflected back to the neutral winding by transformer action, as the induced voltage in the secondary winding increases due to an increasing line-to-ground fault current. A constant current high frequency oscillator and a voltage monitor are connected across the neutral winding.

In operation, and absent a line or neutral fault, the current from the oscillator produces a high frequency voltage component across the neutral winding of a fixed predetermined value. Should a line fault exist producing a non-zero net magnetomotive force in the core, an induced voltage appears in the secondary winding, causing current to flow in the secondary winding load, resulting in a decrease in the dynamic impedance thereof. The decreased dynamic impedance of the secondary winding load is reflected back by transformer action to the neutral winding causing the high frequency component voltage across the neutral windings to decrease, the high frequency current therethrough being constant. When the high frequency voltage across the neutral winding decreases to a level corresponding to a line-to-ground fault current in excess of 5 milliamperes, a circuit breaker is actuated to interrupt the line conductor.

Should a neutral fault exist, high frequency current from the oscillator is shunted by the neutral-to-ground fault path away from the neutral winding, causing a reduction in the high frequency voltage component across the neutral winding. When the reduction in voltage across the neutral winding decreases to a level corresponding to a neutral-to-ground resistance of less than 4 ohms, the voltage monitor causes the circuit breaker to interrupt the line conductor.

In an alternative form of the invention, the constant current high frequency oscillator and voltage monitor connected across the neutral winding are replaced by a constant voltage high frequency oscillator and a current monitor connected between the load side of the neutral conductor and (ground) high side of the constant voltage generator. A reduction in resistance of the neutral winding occasioned by a line-to-ground fault causes the neutral winding to draw more current from the constant voltage source. This increase in current is sensed by the current monitor and trips the circuit breaker to interrupt the line conductor when the line-to-ground leakage current exceeds 5 milliamperes. A neutral-to-ground fault, by providing a second path to ground from the load side of the neutral conductor, which second path is in addition to the normal path to ground through the neutral winding draws additional current from the constant voltage oscillator which is sensed by the current monitor in series therewith. When the increase in current reaches a level corresponding to a neutral-to-ground resistance of less than 4 ohms, the circuit breaker is triggered to interrupt the line conductor.

These and other features, objectives and advantages of the invention will become more readily apparent from a detailed description thereof taken in conjunction with the drawings in which:

Figures 1, 3, 4:
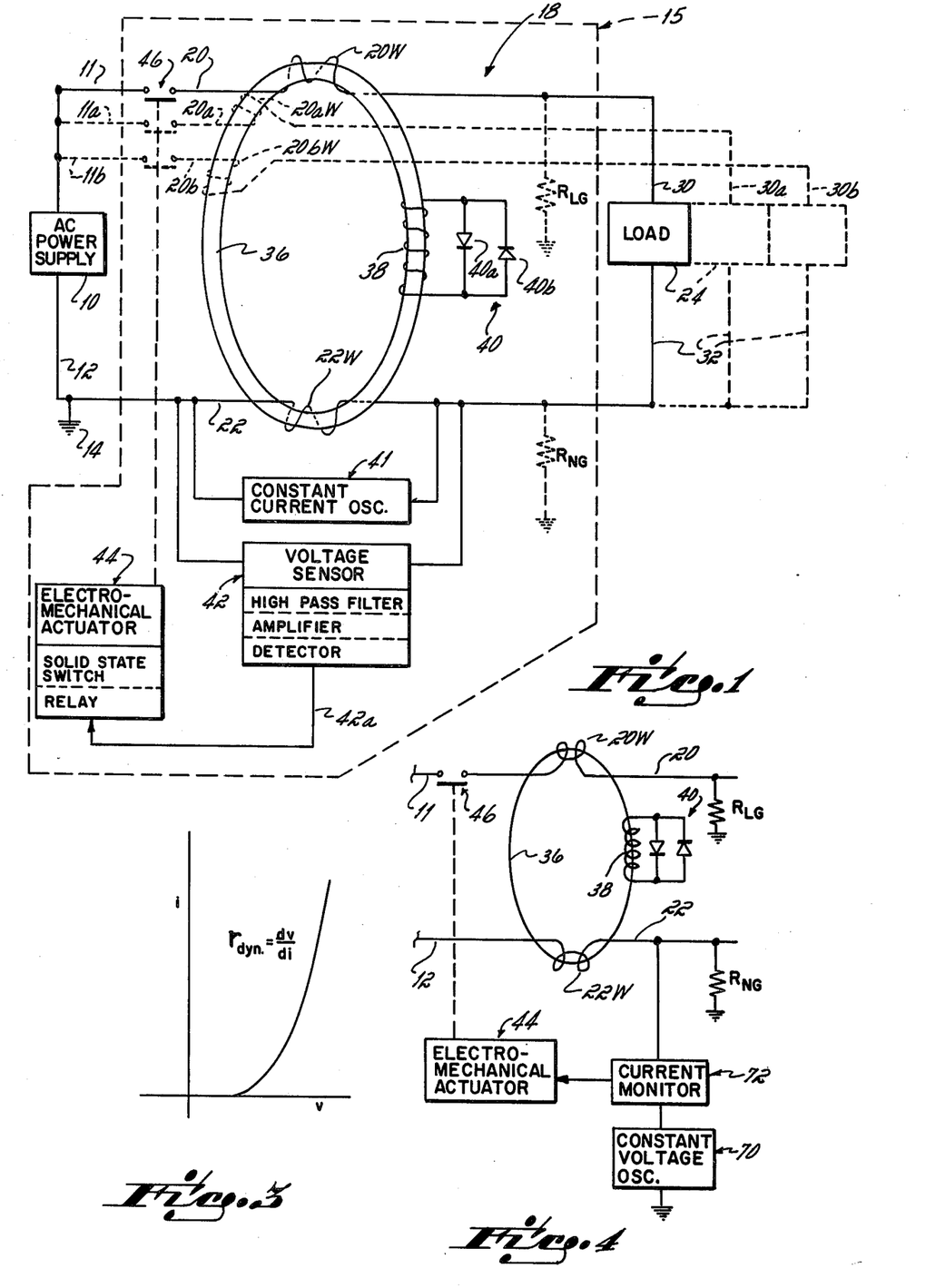
FIG. 1 is a schematic circuit in block diagram format of one preferred embodiment of the invention using a constant current oscillator in combination with a voltage monitor to sense line and neutral faults.
FIG. 3 is a plot of current versus voltage for a solid state diode exhibiting a nonlinear dynamic resistance which decreases with increasing current flow therethrough.
FIG. 4 is a schematic circuit in block diagram format of a second embodiment of the invention utilizing a constant voltage oscillator in combination with a current monitor for detecting line and neutral faults.

With reference to FIG. 1, an AC power supply 10, such as a 60 Hz electrical power distribution system, is seen to include at least one "hot" or line bus 11 and a neutral bus 12 which is grounded as shown at 14. If the AC power supply 10 is polyphase one or more additional line busses 11a and/or 11b may be provided. In a polyphase AC power supply, the current in each of the line busses 11, 11a and 11b is different in phase from the other. The line busses 11, 11a and 11b and the neutral bus 12 are brought to a suitable electrical outlet box 15 which contains the fault detection and protection circuit of this invention indicated generally by reference numeral 18. Line busses 11, 11a and/or 11b are connected to electrical conductors 20, 20a and 20b which are often referred to as the "line conductors," while neutral bus 12 is connected to a conductor 22 typically referred to as the "neutral conductor."

The load 24 to be supplied, if polyphase, is connected across the neutral conductor 22 and the line conductor(s) 20, 20a and 20b via conductors 32 and 30, 30a and 30b respectively. The load 24 could consist of one or more separate single phase loads respectively connected across one or more conductor pairs 30–32, 30a–32 and/or 30b–32.

The fault detection and protection circuit 18, which is designed and packaged to fit within the outlet box 15, includes a magnetic core 36, a secondary winding 38 wound on the core having a load 40 connected to it, a constant current oscillator 41, a voltage sensor 42, an electromechanical actuator 44 and a circuit breaker 46.

The transformer core 36 is preferably toroidal in shape and manufactured of material having a high magnetic permeability, e.g., Supermalloy. In one preferred form of the invention, the core has an outside diameter of 13/16", an inside diameter of 7/16" and a width of ¼". The line conductor(s) 20, 20a and/or 20b, whether there be one, two or three, are wound on the core 36, forming line conductor windings 20W, 20aW and/or 20bW. All line and neutral windings 20W, 20aW, 20bW and 22W are wound on the core in the same sense so that only the net current difference produces an mmf in the core.

The secondary winding 38 is preferably constructed of wire having a diameter substantially less than that of the line and neutral windings 20W and 22W.

A line-to-ground fault is represented by a resistor $R_{LG}$ connected between the line conductor, e.g., line conductor 20, and ground. A neutral-to-ground fault is represented by a resistor $R_{NG}$ connected between the neutral line 22 and ground. In the absence of line and neutral faults, all of the current flowing to the load 24 from supply 10 via the line conductor(s) returns to the supply via the neutral conductor 22. The number of turns of each of the line windings 20W, 20aW and 20bW and of the neutral winding 22W are such that in the absence of a line-to-ground fault and a neutral-to-ground fault, the magnetomotive force in the core 36 produced by the combined line conductors will be equal in magnitude and opposite in direction to that produced by the neutral conductor 22, thereby providing a net magnetomotive force in the core which is equal to zero.

When a line-to-ground fault occurs, not all of the current passing through the line conductor 20 returns to the AC power supply 10 via the neutral conductor 22, but rather some of the current in the line conductor 20 returns to the power supply via the line-to-ground fault path represented by resistor $R_{LG}$. Under such conditions, the current returning to the grounded side of the AC power supply 10 via the neutral conductor 22 is less than the current flowing from the AC power supply on line conductor 20. This current differential in the line conductor 20 and the neutral conductor 22, both of which conductors are wound on the core 36, produces a non-zero net magnetomotive force in the core 36. Should the line-to-ground current flowing through resistor $R_{LG}$ exceed 5 milliamperes, the maximum limit not permitted by Underwriters' Laboratory, the net magnetomotive force in core 36 due to the current imbalance in line conductor 20 and neutral conductor 22 will be sufficient, in a manner to be described hereafter, to actuate the circuit breaker 46 and interrupt the line conductor 20.

The secondary winding 38 and associated load 40, in cooperation with the neutral winding 22W, constant current oscillator 41 and voltage sensor 42, produce a fault signal on output line 42a for energizing the electromechanical actuator 44, which in turn moves the circuit breaker 46 from its normally closed position to an open circuit position, interrupting line conductor 20, when a line-to-ground fault represented by resistor $R_{LG}$ which is sufficient to provide a leakage current through resistor $R_{LG}$ exceeding 5 milliamperes. The constant current oscillator 41, which operates at a frequency different than that of the AC power supply 10, such as a frequency of 9 kHz, is connected across the neutral winding 22W to provide, absent a neutral-to-ground fault represented by resistor $R_{NG}$, a constant 9 kHz current through the winding 22W. Thus, absent a neutral-to-ground fault which shunts current from the oscillator 41 away from the neutral winding 22W via the neutral fault path represented by resistor $R_{NG}$, all the current from the constant current oscillator 41 passes through the neutral winding 22W, producing a high frequency voltage component across the winding 22W of predetermined magnitude. The oscillator current is typically one-fourth ma and, in the absence of a line fault ($R_{LG}=\infty$) and a neutral fault ($R_{NG}=\infty$), the oscillator frequency impedance between neutral and ground is in excess of 10 ohms, so that the voltmeter 42, which is coupled by a low frequency blocking circuit which rejects 60 Hz but responds well to the oscillator frequency, measures several millivolts.

As will be apparent hereafter, should a line-to-ground fault occur, the resistance of secondary winding load 40 decreases. This decrease is reflected back to neutral winding 22W by transformer action, decreasing the resistance of this winding. Since the current through neutral winding 22W from oscillator 41 is constant absent a neutral-to-ground fault, a decrease in resistance of winding 22W due to a line fault is manifested by a drop in the 9 kHz voltage component across winding 22W. It is this drop in voltage which is sensed by voltage sensor 42 to trip circuit breaker 46 when a line fault occurs.

More specifically, should a line-to-ground fault occur (represented by resistor $R_{LG}$) and current be returned to the AC power supply 10 from the load side of the line conductor 20 via the line conductor leakage path through resistor $R_{LG}$, a current imbalance results in line conductor winding 20W and neutral conductor winding 22W producing a non-zero net magnetomotive force in core 36, which in turn induces a voltage in the secondary winding 38. The induced voltage in the secondary winding 38 produces a current flow through the load 40, which preferably is in the form of a pair of oppositely poled parallel connected diodes 40a and 40b. The current flowing in each of the load diodes 40a and 40b, assuming the diodes are forward biased, is related to the voltage thereacross by the equation $i = I_S e^{(qv/Kt)}$, where i equals the instantaneous current through the diode (amperes)

$I_S$ is the saturation current of the diode, which is constant for a given diode, and temperature q is the charge on an electron (coulombs), v is the instantaneous voltage across the diode (volts), K is Boltzmann's constant, and T is the temperature (degrees Kelvin). The general form of the above equation, covering both forward and reverse biased diodes, is $$i = I_S[e^{\frac{qv}{KT}} - 1].$$

With reference to FIG. 3, which is a plot of the current versus voltage of a diode, such as diode 40a and/or 40b, it is apparent that as the voltage across the diodes increases the current increases, and further that the relationship between the current and voltage is nonlinear with the current increasing as an exponential function of the voltage. Accordingly, the diodes 40a and 40b have a dynamic resistance characteristic. From the foregoing equation, the dynamic resistance of a forward biased diode, r, equals (KT/qi). For example, at room temperature (T=27° C.=300° K.) the value of (KT/q) is 0.0258 volts so that a current flow of 1 microampere would result in a dynamic diode resistance of 25,800 ohms. A 10 microampere diode current would result in a diode dynamic resistance of 2,580 ohms.

From the foregoing, it is clear that when a line-to-ground fault exists, that is, when a leakage current path represented by resistor $R_{LG}$ exists between the load side of the line conductor 20 and ground, not all of the line conductor current returns to the AC power supply 10 via the neutral conductor 22, but rather some current is shunted via the line-to-ground leakage path represented by resistor $R_{LG}$. This shunting of line conductor current via the line-to-ground leakage path represented by resistor $R_{LG}$ produces a current imbalance in the line winding 20W and the neutral winding 22W, producing a non-zero net magnetomotive force in the core 36. The non-zero net magnetomotive force in the core 36 induces a voltage in the secondary winding 38 which causes a current to flow on alternate half-cycles through the respective load diodes 40a and 40b. As the line-to-ground leakage current through resistor $R_{LG}$ increases, the current imbalance in the line and neutral conductors 20 and 22 increases causing an increase in the net magnetomotive force in the magnetic core 36, which in turn increases the induced voltage in the winding 38 and the current through the diodes 40a and 40b. Due to the nonlinear exponential relationship between resulting current and voltage applied to the diodes 40a and 40b, as the induced voltage increases, the current through the diodes increases exponentially, causing the dynamic resistance of the diodes to drop. Since the secondary winding 38 and the neutral winding 22W are wound on the magnetic core 36, the reduction in dynamic resistance of the diode load 40 as a consequence of the increasing line-to-ground leakage current through resistor $R_{LG}$ is reflected back as a decrease in the impedance of the neutral winding 22W, the reflected impedance being in proportion to the square of the ratio of the number of turns on the secondary winding 38 to the number of turns on the neutral winding 22W. For example, and assuming the turns ratio between winding 38 and 22W is 70.7 to 1, if the dynamic resistance of the diodes 40a and 40b decreases from 25,800 ohms to 2,580 ohms, the impedance of the neutral winding 22W decreases from 5.16 to 0.516 ohms. Summarizing, when a line-to-ground fault occurs (represented by resistor $R_{LG}$), the dynamic resistance of the load 40 decreases, the decrease being reflected back via transformer action to the neutral winding 22W, causing a decrease in the impedance of the neutral winding 22W.

As noted previously, a constant current 9 kHz oscillator 41 is connected to the neutral winding 22W, and absent a neutral-to-ground leakage path via resistor $R_{NG}$, a 9 kHz current of constant magnitude passes through the neutral winding 22W from the constant current oscillator. This constant magnitude 9 kHz current, assuming a line-to-ground fault path through resistor $R_{LG}$ does not exist (and no neutral-to-ground fault is present), provides a 9 kHz voltage component of predetermined magnitude across the neutral winding 22W. Should a line-to-ground fault occur and the impedance of the neutral winding 22W decrease in the manner and for the reasons previously described, the constant current from the oscillator 41 flowing through the neutral winding 22W will produce a decrease in the 9 kHz voltage component across the neutral winding 22W. This decrease in the 9 kHz voltage component across neutral winding 22W is detected by the voltage sensor 42, producing a fault signal on line 42a to the electromechanical actuator 44 which trips the circuit breaker 46, open-circuiting the neutral line 20. The voltage sensor 42 is designed such that the electromagnetic actuator 44 is actuated, tripping the circuit breaker 46, only when the decrease in voltage across the neutral winding 22W drops to a level corresponding to a line conductor leakage path through resistor $R_{LG}$ exceeding 5 milliamperes.

Significantly, it is the voltage drop across the neutral conductor winding 22W which is sensed when a line-to-ground leakage path exists as represented by resistor $R_{LG}$. It is not the voltage across the secondary winding 38 which is sensed.

The same circuitry utilized to detect a line-to-ground fault and trip the circuit breaker 46 to interrupt the line conductor 20, namely, constant current oscillator 41, voltage sensor 42 and electromechanical actuator 44, is also used to detect a neutral-to-ground fault which is represented by the resistor $R_{NG}$. As noted previously, and in the absence of a neutral-to-ground fault, the constant current oscillator 41 supplies a 9 kHz current of constant magnitude to the neutral winding 22W which causes a constant 9 kHz voltage component thereacross. Should a neutral-to-ground fault occur, a certain portion of the 9 kHz current from the constant current oscillator 41, the magnitude of which depends upon the magnitude of the resistance of the neutral-to-ground leakage path $R_{NG}$, will be shunted from oscillator 41 away from the winding 22W to ground via the leakage path through the neutral-to-ground fault resistor $R_{NG}$. The shunting of current from the constant current oscillator 41 to ground via the neutral-to-ground leakage resistor $R_{NG}$ results in a reduction of the 9 kHz current flowing through the neutral winding 22W from the constant current oscillator 41 to ground. This reduction in 9 kHz current through the neutral winding 22W, which occurs as a consequence of a neutral-to-ground fault, causes the 9 kHz voltage component across the neutral winding 22W to decrease. This decrease is the 9 kHz voltage component across the neutral winding 22W is sensed by the voltage sensor 42, providing a fault signal 42a at its output. The fault signal on line 42a will actuate the electromagnetic actuator and trip the circuit breaker 46 to interrupt the line conductor 20 when the resistance to ground from the neutral conductor represented by resistor $R_{NG}$ falls below 4 ohms corresponding to a neutral-to-ground fault.

Significantly, the 9 kHz voltage component across neutral winding 22W decreases when either a line-to-ground fault or a neutral-to-ground fault exists. Accordingly, the various circuit parameters, such as core size and material, winding turns, and diode material, should be selected such that the drop in the 9 kHz voltage component across neutral winding 22W is the same in magnitude for both a line fault, i.e., a leakage current through resistor $R_{LG}$ of more than 5 milliamperes, and a neutral fault, i.e., a ground leakage path resistance $R_{LG}$ from the neutral conductor of less than 4 ohms. Assuming the circuit parameters are so selected, leakage current of more than 5 milliamperes from a line conductor to ground and a less than 4 ohm resistance path from the neutral conductor to ground will provide equal magnitude decreases in the 9 kHz voltage component across neutral winding 22W, causing the voltage sensor to provide a fault signal output on line 42a to actuate the electromechanical actuator 44 and in turn move the circuit breaker 46 from its normally closed circuit conditions to an open circuit condition to interrupt the line conductor 20.

Thus, a fault detection and line conductor interruption circuit has been provided which monitors the voltage across the same winding, namely, the neutral winding, to detect both line faults and neutral faults. In addition, the circuitry required is minimized, for example, requiring only a secondary winding 38 and a diode load 40 wound on a magnetic core 36, in addition to a constant current oscillator 41, voltage sensor 42, electromagnetic actuator 44 and circuit breaker 46.

Figures 2, 5:
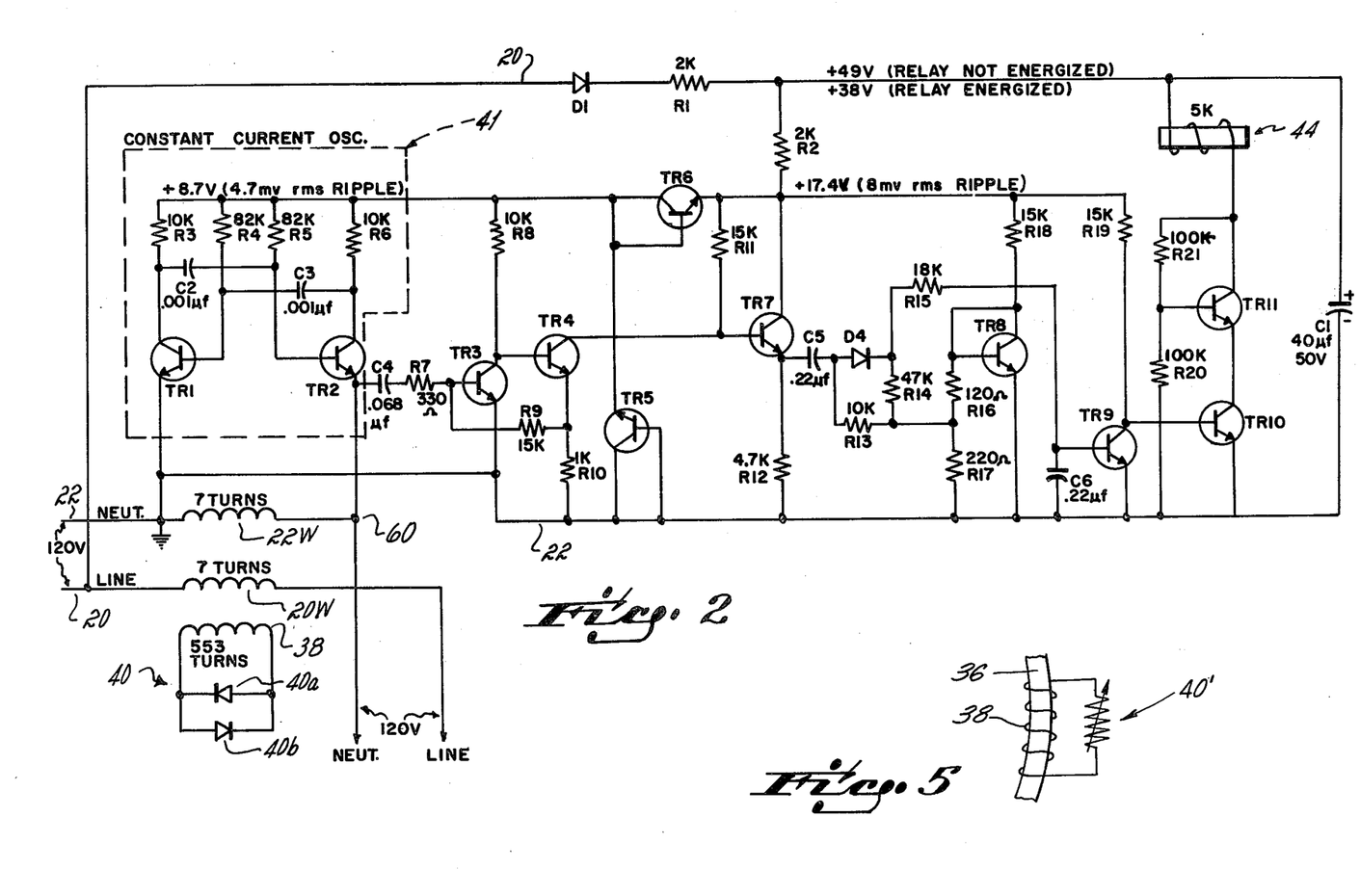
FIG. 2 is a detail circuit diagram of the preferred embodiment of FIG. 1.
FIG. 5 is a schematic circuit diagram of a portion of a modification of the preferred embodiment shown in FIG. 1.

FIG. 2 shows one suitable circuit for the preferred embodiment of the invention shown in schematic block diagram format in FIG. 1. An electromagnetic actuator 44 in the form of a solenoid is connected across the line conductor 20 and neutral conductor 22 via a half-wave rectifying diode D1, resistor R1 and power amplifier transistors TR10 and TR11 arranged in a "totem pole connection" which permits the transistors to divide the available voltage equally between them and to operate in combination at a voltage twice the voltage that one transistor could tolerate alone. A smoothing capacitor C1 is connected across the series combination of the solenoid 44 and power amplifier transistors TR10 and TR11. An average voltage of approximately 50 volts, with substantial saw tooth ripple, appears across capacitor C1. This voltage is applied through resistor R2 in series with transistor TR6 and TR5 to the amplifier circuitry. These two transistors, connected as reverse bias emitter-base diodes, operate in the avalanche mode and establish low ripple DC voltages of 8.7 on the left side of the circuit and 17.4 volts on the right side of the circuit. These values change slightly with the actual transistors used.

The oscillator 41 is in the form of a multivibrator providing a 9 kHz square wave output across the neutral winding 22W. In the multivibrator the emitter of transistor TR1 is returned directly to ground while the emitter of transistor TR2 is returned to neutral. As conduction switches between the two multivibrator sections, the supply voltage of approximately 8.7 volts will be alternately connected and disconnected from the neutral terminal through the 10 K resistor R6. Consequently, a constant square wave current, of approximately 0.87 ma peak to peak, will be made to flow between the neutral and ground terminals through whatever path is available. The multivibrator frequency of approximately 9 kHz is used because it has been found experimentally that this frequency provides the maximum neutral to ground voltage for the differential transformer systems used. The voltage developed is relatively insensitive to the frequency used so that substantial variations in frequency can be tolerated.

By reason of the fact that the resistance of resistors R3 and R6 is so much larger than the resistance of the neutral winding 22W, the current flow during alternate cycles through the multivibrator switching transistor TR1 and TR2 is a function substantially of the magnitude of the resistors R3 and R6 and is substantially independent of the impedance of the winding 22W.

The voltage across the neutral winding 22W is coupled from point 60 via a high pass filter C4, R7 to a cascaded signal amplifier TR3, TR4 and TR7. The amplified output present at the emitter of transistor TR7 is capacitively coupled to a one-half wave rectifier detector consisting of diode D4 and resistors R13 and R14. Since the cutoff frequency of the coupling circuitry C4, R7 is very high compared to the 60 Hz power frequency and slightly less than the 9 kHz oscillator frequency, for all practical purposes only multivibrator frequency signals are applied to the signal amplifier for amplification thereby and subsequent detection by the detector.

The transistor amplification stages TR3 and TR4 operate with approximately 40 db of DC feedback and 12 db of AC feedback thereby insuring stability relative to component and temperature variations. Transistor TR7 is an emitter-follower output stage for the signal amplifier to insure low source impedance for the detector section. With the exception of C4 input capacitor and C5 output capacitor, the signal amplifier section is direct coupled throughout, insuring low cost and physical volume and ease of conversion to an integrated circuit form. The overall gain of the amplifier is about 700, and with no faults present on the system, the output voltage is about 2 volts.

The output of the detector is applied via coupling resistor R15 to the base of power amplifier driver stage transistor TR9. Fixed bias for the power amplifier driver stage TR9 is obtained from the voltage divider R16, R17 connected across the forward biased, diode connected, transistor TR8. This method of biasing insures proper bias voltage tracking of the driver section with temperature variations. Approximately two-thirds of the TR8 diode voltage is used as fixed bias and this is insufficient to render the driver stage conductive.

As noted, diode D4, in combination with resistors R13 and R14, constitute a half-wave rectifier detector. The detector develops a voltage across resistor R14 proportional to the average value of the positive half of the signal voltage appearing across the resistor R12. The voltage across resistor R14 is added to the fixed bias across resistor R17, and applied through resistor R15 to the base of transistor TR9. The capacitor C6, in combination with the resistance elements in the circuit, filters out the high frequency ripple present across resistor R14 and provides an essentially constant voltage at the base of transistor TR9.

In a no fault condition, the sum of the fixed bias and detected signal voltage is enough to maintain driver transistor TR9 in saturation and therefore power transistors TR10 and TR11 in cutoff. When the signal voltage is reduced sufficiently, due to either line-to-ground or neutral-to-ground faults, driver transistor TR9 ceases to conduct and its collector current is transferred to the base of transistor TR10 which brings the "totem pole" into full conduction, energizing the electromagnetic actuator 44 which in turn trips the circuit breaker 46.

Instead of using a voltage sensor having switching transistors TR10 and TR11, and a driver transistor TR9 responsive to the detector output, an SCR controlled by the output of an operational amplifier responsive to the output of detector resistor R15 could be utilized. Voltage sensors of other designs could also be used.

In the embodiment of FIG. 1, a constant current oscillator 41 in combination with a voltage sensor 42 is utilized to detect decreases in resistance of the neutral winding 22W occasioned by line faults and decreases in current through neutral winding 22W associated with a neutral fault. Alternatively, and as shown in FIG. 4, these changes associated with line and neutral faults could be detected with the combination of a constant voltage oscillator 70 connected to the load side of the neutral winding 22W and a current monitor 72 in series with the oscillator connected between it and the neutral conductor 22. With such an arrangement, and absent either a line fault or a neutral fault, the 9 kHz constant voltage oscillator 70 connected to the neutral winding 22W produces a predetermined 9 kHz current flow through the winding 22W which is sensed by the current monitor 72. Should a neutral-to-ground fault occur, the leakage resistor $R_{NG}$ is effectively placed in parallel with the winding 22W between the constant voltage oscillator 70 and ground, causing the oscillator to supply increased current. This increase in current is sensed by the current monitor 72 in series therewith, producing a fault signal which actuates the electromechanical actuator 44 to trip the circuit breaker 46. Should a line-to-ground fault occur, causing the impedance of the neutral winding 22W to decrease, the current supplied by the constant voltage oscillator 70 increases. The increase in current is sensed by the current monitor 72 and the actuator 44 operated to trip the circuit breaker 46.

While the preferred embodiment is described in connection with a solid state diode connected across the winding 38, a thermistor 40' enclosed in a glass envelope or bead could also be used, as could a vacuum tube diode. If a thermistor is used, as shown in FIG. 5, the number of turns of winding 38 can be substantially reduced, although there is some sacrifice in temperature stability in comparison to that of a solid state diode. Where a vacuum tube diode is used, temperature stability is enhanced.

What is claimed is:

1. A ground fault circuit interrupter, which is connectable with the line and neutral conductors between an AC power supply of a first frequency and a load, for interrupting the line conductor when either (a) the leakage current from the line conductor to ground exceeds a predetermined maximum limit associated with a line fault and/or (b) the resistance between the neutral conductor and ground decreases below a predetermined minimum limit associated with a neutral fault, said ground fault circuit interrupter comprising:
   a transformer core, said line and neutral conductors being wound on said core to define line and neutral windings, said line and neutral windings being wound on said core in phase opposition to produce a substantially net mmf of zero when the line and neutral conductor currents are equal which occurs in the absence of a line and/or neutral fault,
   a constant current AC source of a second frequency different from that of said first frequency of said AC power supply, said constant current source being connected across said neutral winding to supply thereto in the absence of a neutral fault a predetermined current for producing a predetermined voltage component across said neutral winding, current from said constant current source being shunted to ground without passing through said neutral winding in the presence of a neutral fault to reduce said voltage component across said neutral winding attributable to current from said constant current source,
   a secondary winding wound on said core in which a voltage is induced when a current imbalance exists in said line and neutral conductors in the presence of a line fault,
   an impedance connected across said secondary winding having a variable dynamic resistance which decreases with increasing voltage thereacross, said variable dynamic resistance being reflected back to said neutral winding by transformer action to decrease said neutral winding resistance, and in turn said voltage component thereacross attributable to current from said constant current source, when said induced voltage across said secondary winding increases in response to a line fault,
   a voltage sensor connected across said neutral winding for providing a fault signal when said voltage component across said neutral winding attributable to current from said constant current source decreases to a value associated with a line fault and/or a neutral fault,
   a selectively actuable circuit breaker connected in said line conductor for interrupting power to said line conductor when actuated, and
   means responsive to said fault signal for actuating said circuit breaker when a line and/or neutral fault occurs.

2. The ground fault circuit interrupter of claim 1 wherein there are at least plural line conductors connected between said AC power supply and said load, said plural line conductors being wound on said core with the same polarity to produce a substantially zero net magnetomotive force in said core in the absence of a line or neutral fault.

3. The ground fault circuit interrupter of claim 1 wherein said second frequency is substantially higher than said first frequency, said circuit interrupter further including a filter network connected between said voltage sensor and said neutral winding for blocking said first frequency.

4. The circuit interrupter of claim 1 wherein said secondary winding has substantially more turns than said neutral winding and is constructed of wire having a diameter substantially less than that of said neutral winding.

5. The circuit interrupter of claim 4 wherein said core is a toroidal code.

6. The circuit interrupter of claim 1 wherein said neutral and line windings have substantially the same number of turns, which number is substantially less than that of said secondary winding.

7. The circuit interrupter of claim 1 wherein said variable dynamic resistance includes at least one solid state diode connected across said secondary winding.

8. The circuit interrupter of claim 1 wherein said variable dynamic resistance includes at least one diode.

9. The circuit interrupter of claim 1 wherein said dynamic resistance includes at least one thermistor.

10. A ground fault circuit interrupter, which is connectable with the line and neutral conductors between an AC power supply of a first frequency and a load, for interrupting the line conductor when either (a) the leakage current from the line conductor to ground exceeds a predetermined maximum limit associated with a line fault and/or (b) the resistance between the neutral conductor and ground decreases below a predetermined minimum limit associated with a neutral fault, said ground fault circuit interrupter comprising:

a transformer core, said line and neutral conductors being wound on said core to define line and neutral windings, said line and neutral windings being wound on said core in phase opposition to produce a net mmf of substantially zero when the line and neutral conductor currents are equal which occurs in the absence of a line and/or neutral fault, a constant voltage AC source of a second frequency different from that of said first frequency of said AC power supply, said constant voltage source being connected across said neutral winding to provide, in the absence of a neutral fault, a predetermined current level at the output of said constant voltage source, current from said constant voltage source being shunted to ground without passing through said neutral winding when a neutral fault exists, thereby causing the current output from said constant voltage source to increase above said predetermined level to a fault level when a neutral fault is present, a secondary winding wound on said core in which a voltage is induced when a current imbalance exists in said line and neutral conductors in the presence of a line fault, an impedance connected across said secondary winding having a variable dynamic resistance which decreases with increasing voltage thereacross, said variable, dynamic resistance being reflected back to said neutral winding by transformer action to decrease said neutral winding resistance, and in turn increase the component of current therethrough supplied by said constant voltage source above said predetermined level to a fault level, when said induced voltage across said secondary winding increases in response to a line fault, a current sensor connected in series with said constant voltage source for providing a fault signal when the current supplied by said constant voltage source increases above said predetermined level to said fault level associated with a line fault and/or a neutral fault, a selectively actuable circuit breaker connected in said line conductor for interrupting power in said line conductor when actuated, and means responsive to said fault signal for actuating said circuit breaker when a line and/or neutral fault occurs.

11. The ground fault circuit interrupter of claim 10 wherein there are at least plural line conductors connected between said AC power supply and said load, said plural line conductors being wound on said core with the same polarity to produce a substantially zero net magnetomotive force in said core in the absence of a line or neutral fault.

12. The ground fault circuit interrupter of claim 10 wherein said second frequency is substantially higher than said first frequency, said circuit interrupter further including a filter network connected between said current sensor and said neutral winding for blocking said first frequency.

13. The circuit interrupter of claim 10 wherein said secondary winding has substantially more turns than said neutral winding and is constructed of wire having a diameter substantially less than that of said neutral winding.

14. The circuit interrupter of claim 13 wherein said core is a toroidal core.

15. The circuit interrupter of claim 10 wherein said neutral and line windings have substantially the same number of turns, which number is substantially less than that of said secondary winding.

16. The circuit interrupter of claim 10 wherein said variable dynamic resistance includes at least one solid state diode connected across said secondary winding.

17. A ground fault circuit interrupter, which is connectable with the line and neutral conductors between an AC power supply of a first frequency and a load, for interrupting the line conductor when either (a) the leakage current from the line conductor to ground exceeds a predetermined maximum limit associated with a line fault and/or (b) the resistance between the neutral conductor and ground decreases below a predetermined minimum limit associated with a neutral fault, said ground fault circuit interrupter comprising:

a transformer core, said line and neutral conductors being wound on said core to define line and neutral windings, said line and neutral windings being wound on said core in phase opposition to produce a net mmf of substantially zero when the line and neutral conductor currents are equal which occurs in the absence of a line and/or neutral fault, a constant voltage AC source of a second frequency different from that of said first frequency of said AC power supply, said constant voltage source being connected across said neutral winding to provide, in the absence of a neutral fault, a predetermined current level at the output of said constant voltage source, current from said constant voltage source being shunted to ground without passing through said neutral winding when a neutral fault exists, thereby causing the current output from said constant voltage source to increase above said predetermined level to a fault level when a neutral fault is present, a secondary winding wound on said core in which a voltage is induced when a current imbalance exists in said line and neutral conductors in the presence of a line fault, a thermistor connected across said secondary winding having a variable resistance which decreases with increasing temperature induced by increased current flow therethrough resulting from a line-to-ground fault, said variable resistance being reflected back to said neutral winding by transformer action to decrease said neutral winding resistance, and in turn increase the component of current therethrough supplied by said constant voltage source above said predetermined level to a fault level, when said induced voltage across said secondary winding increases in response to a line fault, a current sensor connected in series with said constant voltage source for providing a fault signal when the current supplied by said constant voltage source increases above said predetermined level to said fault level associated with a line fault and/or a neutral fault, a selectively actuable circuit breaker connected in said line conductor for interrupting power in said line conductor when actuated, and means responsive to said fault signal for actuating said circuit breaker when a line and/or neutral fault occurs.

18. A ground fault circuit interrupter, which is connectable with the line and neutral conductors between an AC power supply of a first frequency and a load, for interrupting the line conductor when the leakage current from the line conductor to ground exceeds a predetermined maximum limit associated with a line fault, said ground fault circuit interrupter comprising:

a transformer core, said line and neutral conductors being wound on said core to define line and neutral windings, said line and neutral windings being wound on said core in phase opposition to produce a substantially net mmf of zero when the line and neutral conductor currents are equal which occurs in the absence of a line and/or neutral fault, a constant current AC source of a second frequency different from that of said first frequency of said AC power supply, said constant current source being connected across said neutral winding to supply thereto in the absence of a neutral fault a predetermined current for producing a predetermined voltage component across said neutral winding, a secondary winding wound on said core in which a voltage is induced when a current imbalance exists in said line and neutral conductors in the presence of a line fault, an impedance connected across said secondary winding having a variable dynamic resistance which decreases with increasing voltage thereacross, said variable, dynamic resistance being reflected back to said neutral winding by transformer action to decrease said neutral winding resistance, and in turn said voltage component thereacross attributable to current from said constant current source, when said induced voltage across said secondary winding increases in response to a line fault, a voltage sensor connected across said neutral winding for providing a fault signal when said voltage component across said neutral winding attributable to current from said constant current source decreases to a value associated with a line fault, a selectively actuable circuit breaker connected in said line conductor for interrupting power to said line conductor when actuated, and means responsive to said fault signal for actuating said circuit breaker when a line fault occurs.

19. A ground fault circuit interrupter, which is connectable with the line and neutral conductors between an AC power supply of a first frequency and a load, for interrupting the line conductor when the resistance between the neutral conductor and ground decreases below a predetermined minimum limit associated with a neutral fault, said ground fault circuit interrupter comprising:

impedance means connected in said neutral conductor presenting a relatively low impedance to said first frequency and a relatively high impedance to a second frequency, a constant voltage AC source of said second frequency different from that of said first frequency of said AC power supply, said constant voltage source being connected across said impedance means to provide, in the absence of a neutral fault, a predetermined current level at the output of said constant voltage source, current from said constant voltage source being shunted to ground without passing through said impedance means when a neutral fault exists, thereby causing the current output from said constant voltage source to increase above said predetermined level to a fault level when a neutral fault is present, a current sensor connected in series with said constant voltage source for providing a fault signal when the current supplied by said constant voltage source increases above said predetermined level to said fault level associated with a neutral fault, a selectively actuable circuit breaker connected in said line conductor for interrupting power in said line conductor when actuated, and means responsive to said fault signal for actuating said circuit breaker when a neutral fault occurs.

20. The circuit interrupter of claim 18 wherein said impedance is a diode.

21. The circuit interrupter of claim 18 wherein said impedance is a thermistor.

22. A ground fault circuit interrupter, which is connectable with the line and neutral conductors between an AC power supply of a first frequency and a load, for interrupting the line conductor when the leakage current from the line conductor to ground exceeds a predetermined maximum limit associated with a line fault, said ground fault circuit interrupter comprising:

a transformer core, said line and neutral conductors being wound on said core to define line and neutral windings, said line and neutral windings being wound on said core in phase opposition to produce a net mmf of substantially zero when the line and neutral conductor currents are equal which occurs in the absence of a line and/or neutral fault, a constant voltage AC source of a second frequency different from that of said first frequency of said AC power supply, said constant voltage source being connected across said neutral winding to provide, in the absence of a neutral fault, a predetermined current level at the output of said constant voltage source, a secondary winding wound on said core across which a voltage is induced when a current imbalance exists in said line and neutral conductors in the presence of a line fault, an impedance connected across said secondary winding having a variable dynamic resistance which decreases with increasing voltage thereacross, said variable, dynamic resistance being reflected back to said neutral winding by transformer action to decrease said neutral winding resistance, and in turn increase the component of current therethrough supplied by said constant voltage source above said predetermined level to a fault level, when said induced voltage across said secondary winding increases in response to a line fault, a current sensor connected in series with said constant voltage source for providing a fault signal when the current supplied by said constant voltage source increases above said predetermined level to said fault level associated with a line fault, a selectively actuable circuit breaker connected in said conductor for interrupting power in said line conductor when actuated, and means responsive to said fault signal for actuating said circuit breaker when a line fault occurs.

23. The circuit interrupter of claim 22 wherein said impedance is a diode.

24. The circuit interrupter of claim 22 wherein said impedance is a thermistor.

25. The circuit interrupter of claim 19 further including a transformer core on which said line and neutral conductors are wound to define line and neutral windings, said line and neutral windings being wound on said core in phase opposition to produce a net mmf of substantially zero when the line and neutral conductor currents are equal which occurs in the absence of a line and/or neutral fault, and wherein said impedance means includes said neutral winding across which the series circuit of said constant voltage source and current sensor is connected.

26. The circuit interrupter of claim 10 wherein said dynamic resistance includes at least one diode connected across said secondary winding.

27. The circuit interrupter of claim 20 wherein said diode is a solid state diode.

28. The circuit interrupter of claim 23 wherein said diode is a solid state diode.

29. A ground fault circuit interrupter, which is connectable with the line and neutral conductors between an AC power supply of a first frequency and a load, for interrupting the line conductor when the resistance between the neutral conductor and ground decreases below a predetermined minimum limit associated with a neutral fault, said ground fault circuit interrupter comprising:

impedance means connected in said neutral conductor presenting a relatively low impedance to said first frequency and a relatively high impedance to a second frequency, a constant current AC source of said second frequency different from that of said first frequency of said AC power supply, said constant current source being connected across said impedance means to supply thereto in the absence of a neutral fault a predetermined current for producing a predetermined voltage component across said impedance means, current from said constant current source being shunted to ground without passing through said impedance means in the presence of a neutral fault to reduce said voltage component across said impedance means attributable to current from said constant current source, a voltage sensor connected across said impedance means for providing a fault signal when said voltage component across said impedance means attributable to current from said constant current source decreases to a value associated with a neutral fault, a selectively actuable circuit breaker connected in said line conductor for interrupting power to said line conductor when actuated, and means responsive to said fault signal for actuating said circuit breaker when a neutral fault occurs.

30. The circuit interrupter of claim 29 further including a transformer core on which said line and neutral conductors are wound to define line and neutral windings, said line and neutral windings being wound on said core in phase opposition to produce a net mmf of substantially zero when the line and neutral conductor currents are equal which occurs in the absence of a line and/or neutral fault, and wherein impedance means includes said neutral winding across which the parallel circuit of said constant current source and voltage sensor is connected.

* * * * *

UNITED STATES PATENT AND TRADEMARK OFFICE
CERTIFICATE OF CORRECTION

PATENT NO. : 4,159,499
DATED : June 26, 1979
INVENTOR(S) : Alexander B. Bereskin It is certified that error appears in the above-identified patent and that said Letters Patent are hereby corrected as shown below:

| Col. 6  | Line 57 | "is"                          | should be --in--   |
|---------|---------|-------------------------------|--------------------|
| Col. 7  | Line 13 | after "sensor"                | insert --42--      |
| Col. 7  | Line 48 | after "8.7"                   | insert --volts--   |
| Col. 10 | Line 55 | "code"                        | should be --core-- |
| Col. 14 | Line 66 | before "conductor" insert --line-- |              |
| Col. 16 |         | Delete lines 1 and 2          |                    |

Signed and Sealed this

Twenty-fifth Day of December 1979

[SEAL]

Attest:

SIDNEY A. DIAMOND

Attesting Officer

Commissioner of Patents and Trademarks